(12) United States Patent
King et al.

(10) Patent No.: US 7,335,697 B2
(45) Date of Patent: Feb. 26, 2008

(54) POLYMER COMPOSITION COMPRISING CROSS-LINKED POLYETHYLENE AND METHODS FOR MAKING THE SAME

(75) Inventors: Richard S. King, Warsaw, IN (US); Mark D. Hanes, Winona Lake, IN (US)

(73) Assignee: DePuy Products, Inc., Warsaw, IN (US)

( * ) Notice: Subject to any disclaimer, the term of this patent is extended or adjusted under 35 U.S.C. 154(b) by 134 days.

(21) Appl. No.: 11/021,680

(22) Filed: Dec. 23, 2004

(65) Prior Publication Data

US 2006/0142449 A1 Jun. 29, 2006

(51) Int. Cl.
C08L 23/06 (2006.01)
C08J 3/28 (2006.01)

(52) U.S. Cl. ............ 524/585; 524/490; 524/483; 524/311; 524/312; 524/313; 524/322; 524/383; 524/385; 524/291; 523/300

(58) Field of Classification Search ........ 524/585, 524/311–313, 322, 490, 483, 383, 385, 291; 523/300
See application file for complete search history.

(56) References Cited

U.S. PATENT DOCUMENTS

| | | | |
|---|---|---|---|
| 3,297,805 A | 1/1967 | Rottig et al. | |
| 3,954,927 A | 5/1976 | Duling et al. | |
| 4,454,612 A | 6/1984 | McDaniel et al. | |
| 4,670,508 A | 6/1987 | Ohdaira et al. | |
| 4,778,601 A | 10/1988 | Lopatin et al. | |
| 4,880,843 A | 11/1989 | Stein | |
| 5,275,838 A | 1/1994 | Merrill | |
| 5,288,818 A * | 2/1994 | Livingston et al. | 210/640 |
| 5,414,049 A | 5/1995 | Sun et al. | |
| 5,489,303 A | 2/1996 | Sasaki et al. | |
| 5,593,719 A | 1/1997 | Dearnaley et al. | |
| 5,594,055 A | 1/1997 | Young | |
| 5,721,334 A | 2/1998 | Burstein et al. | |
| 5,827,904 A * | 10/1998 | Hahn | 523/113 |
| 5,844,027 A | 12/1998 | Burdick et al. | |
| 5,879,400 A | 3/1999 | Merrill et al. | |
| 6,017,975 A | 1/2000 | Saum et al. | |
| 6,174,934 B1 | 1/2001 | Sun et al. | |
| 6,228,900 B1 | 5/2001 | Shen et al. | |
| 6,242,507 B1 | 6/2001 | Saum et al. | |
| 6,277,390 B1 | 8/2001 | Schaffner | |
| 6,281,264 B1 | 8/2001 | Salovey et al. | |
| 6,316,158 B1 | 11/2001 | Saum et al. | |
| 6,365,089 B1 | 4/2002 | Krebs et al. | |
| 6,379,741 B1 | 4/2002 | Komvopoulos et al. | |
| 6,395,799 B1 | 5/2002 | Johnson | |
| 6,448,315 B1 * | 9/2002 | Lidgren et al. | 524/110 |
| 6,494,917 B1 | 12/2002 | McKellop et al. | |
| 6,800,670 B2 | 10/2004 | Shen et al. | |
| 6,818,172 B2 | 11/2004 | King et al. | |
| 2002/0125614 A1 | 9/2002 | King et al. | |
| 2003/0083433 A1 | 5/2003 | James et al. | |
| 2003/0125513 A1 * | 7/2003 | King | 528/480 |
| 2003/0144741 A1 | 7/2003 | King et al. | |
| 2003/0144742 A1 | 7/2003 | King et al. | |
| 2003/0149125 A1 | 8/2003 | Muratoglu et al. | |
| 2003/0193110 A1 | 10/2003 | Yaritz et al. | |
| 2003/0212161 A1 | 11/2003 | McKellop et al. | |
| 2004/0156879 A1 * | 8/2004 | Muratoglu et al. | 424/423 |
| 2004/0210316 A1 | 10/2004 | King et al. | |
| 2004/0262809 A1 | 12/2004 | Smith et al. | |
| 2004/0265165 A1 * | 12/2004 | King | 422/28 |
| 2004/0266903 A1 * | 12/2004 | King | 522/157 |
| 2005/0019366 A1 | 1/2005 | Zeldis | |
| 2005/0065307 A1 | 3/2005 | King et al. | |
| 2005/0069696 A1 | 3/2005 | King et al. | |
| 2006/0004168 A1 | 1/2006 | Greer et al. | |
| 2006/0149387 A1 | 7/2006 | Smith et al. | |
| 2006/0149388 A1 | 7/2006 | Smith et al. | |

FOREIGN PATENT DOCUMENTS

| | | |
|---|---|---|
| DE | 227 328 A1 | 9/1985 |
| EP | 0 047 171 A2 | 3/1982 |
| EP | 0 335 613 A2 | 10/1989 |
| EP | 0 730 001 A1 | 9/1996 |
| EP | 0 805 178 A1 | 11/1997 |
| EP | 1 086 709 A1 | 3/2001 |
| EP | 1493775 A1 | 1/2005 |
| EP | 1 779 876 A3 | 5/2007 |
| JP | 48-54168 * | 7/1973 |
| JP | 48-054168 A | 7/1973 |
| JP | 60-252645 A | 12/1985 |

(Continued)

OTHER PUBLICATIONS

JP 48-54168 (abstract in English)□□.*

(Continued)

*Primary Examiner*—David W. Wu
*Assistant Examiner*—Rip A. Lee
(74) *Attorney, Agent, or Firm*—Leydig, Voit & Mayer, Ltd.

(57) ABSTRACT

The invention provides a polymer composition comprising cross-linked polyethylene having a non-polar biocompatible lipid disposed in at least a portion of the free volume of the polyethylene. The invention further provides methods for making the polymer composition.

10 Claims, No Drawings

FOREIGN PATENT DOCUMENTS

| WO | WO 85/04365 A1 | 10/1985 |
| WO | WO 86/02656 A1 | 5/1986 |
| WO | WO 93/25247 A1 | 12/1993 |
| WO | WO 97/29895 A1 | 8/1997 |
| WO | WO 00/49079 A1 | 8/2000 |
| WO | WO 02/26464 A1 | 4/2002 |
| WO | WO 03/057769 A1 | 7/2003 |
| WO | WO 03/087217 A1 | 10/2003 |
| WO | WO 2004/064618 A2 | 8/2004 |

OTHER PUBLICATIONS

Veiga-Crespo et al. (International Microbiology, 2005, 8, 55-58).*

Barr et al., "EPR as a Quality Control Method for the Release of Cross-Linked Ultra High Molecular Weight Polyethylene," Bruker EPR Application Note (Feb. 28, 2003).

Oral et al., *Biomaterials*, 25(24): 5515-5522 (2004).

European Patent Office, Search Report in European Patent Application No. 06255075.1 (Mar. 30, 2007).

Bavaresco et al., "Devices for use as an artificial articular surface in joint prostheses or in the repair of osteochondral defects," *Artificial Organs*, 24 (3): 202-205 (2000).

Beauregard et al., "Synthesis and characterization of a novel UHMWPE interpenetrating polymer network," *Biomedical Sciences Instrumentation*, 35: 415-419 (Apr. 16, 1999).

King et al., "Hydrophilic, pourous ultra-high molecular weight polyethylene for orthopaedic implants," *Transactions 7th World Biomaterials Congress*, 1909 (May 2004).

Kurtz et al., "Advanced in the processing, sterilization, and crosslinking of ultra-high molecular weight polyethylene for total joint arthroplasty," *Biomaterials*, 20 (18): 1659-1688 (1999).

Shutov et al., "Cellular UHMW polyethylene produced by non-foaming leaching technique: Morphology and properties," *J. Cell. Plast.*, 38: 163-176 (Mar. 2002).

Stein, "Ultra high molecular weight polyethylene (UHMWPE)", *Engineered Materials Handbook vol. 2: Engineering Plastics*, 167-171 (ASM International, Materials park, Ohio, US, 1998).

Veiga-Crespo et al., "Influence of culture conditions of *Gordonia jacobaea* MV-26 on canthaxanthin production," *Int. Microbiol.*, 8 (1): 55-58 (Mar. 2005).

Zhang et al., "Surface modification of UHMWPE for use in total joint replacements," *Biomedical Science Instrumentation*, 40: 13-17 (Apr. 2004).

* cited by examiner

POLYMER COMPOSITION COMPRISING CROSS-LINKED POLYETHYLENE AND METHODS FOR MAKING THE SAME

FIELD OF THE INVENTION

This invention pertains to a polymer composition comprising cross-linked polyethylene and a method for making the same.

BACKGROUND OF THE INVENTION

Ultrahigh molecular weight polyethylene ("UHMWPE") is commonly used as a bearing material in orthopaedic implants, such as artificial hip joints. For example, UHMWPE has been used as a liner for the acetabular cup of the hip joint, where it acts as a bearing that facilitates the articulating movement of the femoral head within the acetabular cup.

While UHMWPE can exhibit relatively low rates of wear in most bearing applications, the relatively high elastic modulus of UHMWPE limits its use in applications which require contact with soft tissue, such as cartilage. For example, in such applications, the relatively hard UHMWPE can damage the cartilage after repeated articulation of the implant, especially if the point at which the cartilage and UHMWPE confront each other is subjected to relatively high loads. Thus, attempts have been made to provide implants or implant parts comprising UHMWPE that has been treated to reduce its elastic modulus. For example, U.S. Pat. No. 5,721,334 discloses a process for preparing a shaped article from UHMWPE having an elastic modulus of about 500-800 MPa using specific temperature and pressure profiles during the molding of the article. While the process described in the '334 patent may produce an article exhibiting an elastic modulus that is less than the elastic modulus of a similar article prepared in a conventional manner, the process can only achieve moderate decreases in the elastic modulus of the UHMWPE, which decreases may not be sufficient to address the concerns over soft tissue damage resulting from the use of UHMWPE in certain bearing applications.

Others have attempted to address the problem of providing suitable bearing materials by utilizing other wear-resistant polymers, such as polyurethanes, which have an elastic modulus that is less than the elastic modulus of UHMWPE. While the use of these polymers may provide a bearing surface that causes less trauma to the soft tissue which it confronts, some in the art have voiced concerns over the patient's response to the wear debris generated by these alternate bearing materials. For example, some have voiced concerns over possible tissue necrosis and/or osteolysis in response to the wear debris generated by polyurethane bearings.

A need therefore exists for a polymer composition that exhibits a lower stiffness relative to known polymer compositions comprising UHMWPE, as well as a method for making the same. The invention provides such a polymer composition and method. These and other advantages of the invention, as well as additional inventive features, will be apparent from the description of the invention provided herein.

BRIEF SUMMARY OF THE INVENTION

The invention provides a polymer composition comprising a matrix of cross-linked polyethylene molecules, the matrix having a free volume, and at least one non-polar biocompatible lipid selected from the group consisting of squalane, fatty acids, glycerides, polyisoprenoids, cholesterol, cholesterol esters, and mixtures thereof, wherein the at least one non-polar biocompatible lipid fills at least a portion of the free volume of the matrix.

The invention further provides a method for producing a polymer composition comprising the steps of (a) providing a preform comprising ultrahigh molecular weight polyethylene having a weight average molecular weight of about 400,000 atomic mass units or more, (b) providing a solution comprising at least one non-polar biocompatible lipid selected from the group consisting of squalane, fatty acids, glycerides, polyisoprenoids, cholesterol, cholesterol esters, and mixtures thereof, (c) contacting at least a portion of the preform with the solution to swell the ultrahigh molecular weight polyethylene and diffuse the non-polar biocompatible lipid into at least a portion of the preform, and (d) irradiating at least the portion of the preform contacted with the solution in step (c) to cross-link at least a portion of the ultrahigh molecular weight polyethylene contained therein and form a polymer composition comprising a matrix of cross-linked polyethylene molecules having a free volume, wherein the at least one biocompatible lipid fills at least a portion of the free volume of the matrix.

The invention also provides a method for producing a polymer composition comprising the steps of (a) providing a preform comprising ultrahigh molecular weight polyethylene having a weight average molecular weight of about 400,000 atomic mass units or more, (b) irradiating at least the portion of the preform to cross-link at least a portion of the ultrahigh molecular weight polyethylene contained therein and form a polymer composition comprising a matrix of cross-linked polyethylene molecules having a free volume, (c) providing a solution comprising at least one non-polar biocompatible lipid selected from the group consisting of squalane, fatty acids, glycerides, polyisoprenoids, cholesterol, cholesterol esters, and mixtures thereof, and (d) contacting at least a portion of the preform with the solution to swell the ultrahigh molecular weight polyethylene and diffuse the non-polar biocompatible lipid into at least a portion of the free volume of the matrix.

DETAILED DESCRIPTION OF THE INVENTION

The invention provides a polymer composition comprising a matrix of cross-linked polyethylene molecules. The matrix of polyethylene molecules present in the polymer composition has a free volume. As utilized herein, the term "free volume" refers to the empty volume formed by the interstitial spaces between polyethylene molecules present in the matrix of cross-linked polyethylene molecules. Thus, the free volume of a polymer composition is the unoccupied space in the composition that typically permits movement of the individual polymer molecules.

The polyethylene molecules present in the polymer composition can be derived from any suitable source of polyethylene. Preferably, the polyethylene molecules present in the polymer composition are derived from ultrahigh molecular weight polyethylene having a weight average molecular weight of about 400,000 atomic mass units or more, more preferably about 1,000,000 atomic mass units or more (e.g., about 2,000,000 atomic mass units or more or about 3,000,000 atomic mass units or more). Typically, the weight average molecular weight of the ultrahigh molecular weight polyethylene is about 10,000,000 atomic mass units or less, more preferably about 6,000,000 atomic mass units or less. Ultrahigh molecular weight polyethylene suitable for use in the invention includes, but is not limited to, commercially available ultrahigh molecular weight polyethylene, such as GUR 1050 powdered ultrahigh molecular weight polyethylene (weight average molecular weight of about 4,000,000 to about 6,000,000 atomic mass units) and GUR 1020 powdered ultrahigh molecular weight polyethylene (weight average molecular weight of about 2,000,000 to about 4,000,000 atomic mass units) from Ticona (Summit, N.J.).

The polymer composition comprises at least one non-polar biocompatible lipid filling a portion of the free volume present in the matrix of cross-linked polyethylene molecules. The polymer composition can comprise any suitable non-polar biocompatible lipid. Preferably, the non-polar biocompatible lipid is selected from the group consisting of saturated hydrocarbons (e.g., squalane), fatty acids (e.g., stearic acid), glycerides (e.g., triglycerides such as tristearin), polyisoprenoids (e.g., squalene), cholesterol, cholesterol derivatives (e.g., cholesterol esters such as cholesteryl stearate and cholesteryl palmitate), and mixtures thereof. More preferably, the non-polar biocompatible lipid is squalane or a polyisoprenoid, such as squalene.

As noted above, the non-polar biocompatible lipid fills at least a portion of the free volume of the matrix. The non-polar biocompatible lipid can fill any suitable portion of the free volume. It will be understood that the particular portion of the free volume that is filled with the non-polar biocompatible lipid can depend, at least in part, on the total free volume present in the matrix of cross-linked polyethylene molecules, the particular non-polar biocompatible lipid present in the composition, and the desired final properties of the polymer composition.

The non-polar biocompatible lipid can be present in the polymer composition in any suitable amount. For example, the non-polar biocompatible lipid typically accounts for about 1 wt. % or more, preferably about 1.5 wt. % or more, more preferably about 3 wt. % or more, and most preferably about 5 wt. % or more of the total weight of the polymer composition. However, it will be understood that the maximum amount of lipid that can be contained in the polymer composition can depend, at least in part, on the total free volume present in the matrix of cross-linked polyethylene molecules and the particular non-polar biocompatible lipid present in the composition. Furthermore, the amount of non-polar biocompatible lipid contained in the polymer composition preferably is not so high that a significant amount of the non-polar biocompatible lipid is released from the polymer composition when it is subjected to a mechanical load, such as a compressive or tensile load. Thus, the non-polar biocompatible lipid typically accounts for about 60 wt. % or less, preferably about 55 wt. % or less of the total weight of the polymer composition.

The polymer composition of the invention can exhibit concentration gradients of the non-polar biocompatible lipid. Therefore, in a given polymer composition, the concentration of the non-polar biocompatible lipid near the surface of the polymer composition can be greater than the concentration of the non-polar biocompatible lipid near the interior portions of the polymer composition.

The polymer composition of the invention preferably exhibits at least one improved mechanical property compared to other polymer compositions comprising ultrahigh molecular weight polyethylene. For example, the polymer composition of the invention preferably exhibits a lower elastic modulus (e.g., Young's modulus) and/or a lower coefficient of friction than other polymer compositions comprising ultrahigh molecular weight polyethylene. The polymer composition of the invention also preferably exhibits greater toughness than other polymer compositions comprising ultrahigh molecular weight polyethylene. While not wishing to be bound to any particular theory, it is believed that the non-polar biocompatible lipid contained within the free volume of the matrix of cross-linked polyethylene molecules contributes to the lower elastic modulus and/or coefficient of friction observed for the polymer composition of the invention, while it can also increase the toughness of the polymer composition.

The polymer composition can have any suitable Young's modulus (E). As utilized herein, the term "Young's modulus" refers to the ratio of stress to corresponding strain when the material behaves elastically under tension. The Young's modulus of the polymer composition can be measured using any suitable technique. For example, the Young's modulus of the polymer composition can be measured using the technique described in ASTM Standard D638-03, Type V, and the Young's modulus values recited herein are to be considered as so measured. Typically, the polymer composition has a Young's modulus that is less than the Young's modulus of virgin ultrahigh molecular weight polyethylene (e.g., about 280 MPa or less, or about 225 MPa or less). Preferably, the polymer composition has a Young's modulus (E) of about 215 MPa or less, more preferably about 200 MPa or less, still more preferably about 150 MPa or less, and most preferably about 100 MPa or less (e.g., about 50 MPa or less, about 30 MPa or less, or about 5 MPa to about 30 MPa).

The polymer composition of the invention preferably exhibits a relatively low secant modulus compared to other polymer compositions comprising ultrahigh molecular weight polyethylene. As utilized herein, the term "secant modulus" refers to the slope (i.e., ratio of stress to strain) of a line drawn from the origin of the stress-strain curve to a point on the stress-strain curve corresponding to a particular strain. The secant modulus of the polymer composition can be measured using any suitable point on the stress-strain curve. For example, the secant modulus of the polymer composition can be determined using a point on the stress-strain curve corresponding to 20% elongation of the polymer composition. Typically, the polymer composition has a secant modulus at 20% elongation that is less than the secant modulus of virgin ultrahigh molecular weight polyethylene at the same elongation (e.g., about 100 MPa or less, or about 93 MPa or less). Preferably, the polymer composition has a secant modulus at 20% elongation of about 90 MPa or less (e.g., about 88 MPa or less), more preferably about 80 MPa or less, still more preferably about 70 MPa or less, and most preferably about 60 MPa or less (e.g., about 50 MPa or less, about 40 MPa or less, about 30 MPa or less, about 25 MPa or less, or about 10 MPa to about 25 MPa).

The polymer composition of the invention preferably exhibits a lower storage modulus (E') compared to other polymer compositions comprising ultrahigh molecular weight polyethylene. As utilized herein, the term "storage modulus" refers to the component of applied stress which is in phase with the strain, divided by the strain. The storage modulus of the polymer composition can be measured using any suitable technique, such as Dynamic Mechanical Analysis in accordance with the techniques outlined in ASTM Standard D4065-01. The storage modulus values recited herein are to be considered as so measured. Preferably, the polymer composition has a storage modulus of about 550 MPa or less, more preferably about 500 MPa or less (e.g., about 475 MPa or less), and most preferably about 450 MPa or less (e.g., about 425 MPa or less, about 400 MPa or less, about 375 MPa or less, or about 350 MPa to about 400 MPa).

The polymer composition of the invention preferably exhibits a lower loss modulus (E″) compared to other polymer compositions comprising ultrahigh molecular weight polyethylene. As utilized herein, the term "loss modulus" refers to a measure of the energy dissipated as heat when a material is deformed. The loss modulus of the polymer composition can be measured using any suitable technique, such as Dynamic Mechanical Analysis in accordance with the techniques outlined in ASTM Standard D4065-01. The loss modulus values recited herein are to be considered as so measured. Preferably, the polymer composition has a loss modulus of about 45 MPa or less, more preferably about 40 MPa or less (e.g., about 37 MPa or less), and most preferably about 35 MPa or less (e.g., about 33 MPa or less, or about 30 MPa to about 35 MPa).

The polymer composition of the invention preferably exhibits a higher tan delta (δ) compared to other polymer compositions comprising ultrahigh molecular weight polyethylene. As utilized herein, the term "tan δ" refers to the ratio of the loss modulus (E″) to the storage modulus (E′). The measurements of the loss modulus and storage modulus are described herein. Preferably, the polymer composition has a tan δ greater than 0.085 (e.g., about 0.086 or more, about 0.087 or more, or about 0.088 or more).

The polymer composition of the invention preferably exhibits lower crystallinity compared to other polymer compositions comprising ultrahigh molecular weight polyethylene. The crystallinity of the polymer composition can be measured using any suitable technique, such as Differential Scanning Calorimetry (DSC). As will be understood by those of skill in the art, the crystallinity value obtained for the polymer composition using DSC will need to be "corrected" to account for the non-polar biocompatible lipid contained within the polymer composition. The crystallinity values recited herein are to be considered as so measured. Preferably, the polymer composition exhibits a crystallinity of less than about 49 wt. %, more preferably about 48 wt. % or less, and most preferably about 47 wt. % or less (e.g., about 46 wt. % or less, or about 45.5 wt. % or less).

The polymer composition of the invention can exhibit any suitable hardness. However, the polymer composition preferably exhibits a hardness (e.g., a durometer hardness) that is less than the hardness of virgin ultrahigh molecular weight polyethylene (e.g., a Shore D hardness of less than about 65). Preferably, the polymer composition has a Shore D hardness of about 60 or less (e.g., about 50 or less, or about 40 or less), more preferably about 30 or less. The hardness of the polymer composition can be determined using any suitable technique. Preferably, the hardness (e.g., Shore D hardness) of the polymer composition is determined using the technique described in ASTM Standard D2240-04, and the hardness values recited herein are to be considered as so measured.

The polymer composition of the invention can be made using any suitable method or process. However, the invention further provides methods for producing the polymer composition.

In one embodiment, the invention provides a method for producing a polymer composition comprising the steps of (a) providing a preform comprising ultrahigh molecular weight polyethylene having a weight average molecular weight of about 400,000 atomic mass units or more, (b) providing a solution comprising at least one non-polar biocompatible lipid selected from the group consisting of saturated hydrocarbons, fatty acids, glycerides, polyisoprenoids, cholesterol, cholesterol esters, and mixtures thereof, (c) contacting at least a portion of the preform with the solution to swell the ultrahigh molecular weight polyethylene and diffuse the non-polar biocompatible lipid into at least a portion of the preform, and (d) irradiating at least the portion of the preform contacted with the solution in step (c) to cross-link at least a portion of the ultrahigh molecular weight polyethylene contained therein and form a polymer composition comprising a matrix of cross-linked polyethylene molecules having a free volume, wherein the at least one biocompatible lipid fills at least a portion of the free volume of the matrix.

In another embodiment, the invention provides a method for producing a polymer composition comprising the steps of (a) providing a preform comprising ultrahigh molecular weight polyethylene having a weight average molecular weight of about 400,000 atomic mass units or more, (b) irradiating at least the portion of the preform to cross-link at least a portion of the ultrahigh molecular weight polyethylene contained therein and form a polymer composition comprising a matrix of cross-linked polyethylene molecules having a free volume, (c) providing a solution comprising at least one non-polar biocompatible lipid selected from the group consisting of saturated hydrocarbons, fatty acids, glycerides, polyisoprenoids, cholesterol, cholesterol esters, and mixtures thereof, and (d) contacting at least a portion of the preform with the solution to swell the ultrahigh molecular weight polyethylene and diffuse the non-polar biocompatible lipid into at least a portion of the free volume of the matrix.

The preform utilized in the method of the invention can be provided in any suitable configuration. However, it will be understood that the preform typically is provided in a size or shape that will allow the desired amount of non-polar biocompatible lipid to diffuse into the ultrahigh molecular weight polyethylene within the desired amount of time. For example, when the final polymer composition will be used as a medical implant or medical implant part, the preform can be sized and shaped so that a medical implant or medical implant part can easily be machined therefrom. Alternatively, the preform can sized and shaped so that the final polymer composition produced by the inventive method will be in substantially the same configuration as medical implant or medical implant part (i.e., the final polymer composition would require no machining or only minimal machining to produce a medical implant or medical implant part having the desired configuration). Examples of suitable medical implants or medical implant parts that can be made from the inventive polymer composition include, but are not limited to, the acetabular cup, the insert or liner of the acetabular cup, or trunnion bearings of artificial hip joints, the tibial plateau, patellar button (patello-femoral articulation), and trunnion or other bearing components of artificial knee joints, the talar surface (tibiotalar articulation) and other bearing components of artificial ankle joints, the radio-numeral joint, ulno-humeral joint, and other bearing components of artificial elbow joints, the glenoro-humeral articulation and other bearing components of artificial shoulder joints, intervertebral disk replacements and facet joint replacements for the spine, temporo-mandibular joints (jaw), and finger joints.

Preferably, the ultrahigh molecular weight polyethylene contained in the preform has a weight average molecular weight of about 400,000 atomic mass units or more, more preferably about 1,000,000 atomic mass units or more (e.g., about 2,000,000 atomic mass units or more or about 3,000,000 atomic mass units or more). Typically, the weight average molecular weight of the ultrahigh molecular weight polyethylene is about 10,000,000 atomic mass units or less, more preferably about 6,000,000 atomic mass units or less. Ultrahigh molecular weight polyethylene suitable for use in the invention includes, but is not limited to, commercially available ultrahigh molecular weight polyethylene, such as GUR 1050 powdered ultrahigh molecular weight polyethylene (weight average molecular weight of about 4,000,000 to about 6,000,000 atomic mass units) and GUR 1020 powdered ultrahigh molecular weight polyethylene (weight average molecular weight of about 2,000,000 to about 4,000,000 atomic mass units) from Ticona (Summit, N.J.).

The solution utilized in the method of the invention comprises, consists essentially of, or consists of at least one non-polar biocompatible lipid. Preferably, the non-polar biocompatible lipid is selected from the group consisting of saturated hydrocarbons (e.g., squalane), fatty acids (e.g., stearic acid), glycerides (e.g., triglycerides such as tristearin), polyisoprenoids (e.g., squalene), cholesterol, cholesterol derivatives (e.g., cholesterol esters such as cholesteryl stearate and cholesteryl palmitate), and mixtures thereof. More preferably, the non-polar biocompatible lipid is squalane or a polyisoprenoid, such as squalene.

The preform is contacted with the solution comprising at least one non-polar biocompatible lipid for a time and under conditions sufficient to swell the ultrahigh molecular weight polyethylene and diffuse the non-polar biocompatible lipid into at least a portion of the preform. The preform can be contacted with the solution for any suitable amount of time. It will be understood that the amount of time that the preform is contacted with the solution can depend on several factors, such as the type of non-polar biocompatible lipid present in the solution, the temperature at which the solution is maintained, and the desired amount of non-polar biocompatible lipid to be diffused into the preform. Typically, the preform is contacted with the solution for about 2 hours or more (e.g., about 3 hours to about 12 hours).

The solution comprising at least one non-polar biocompatible lipid can be maintained at any suitable temperature. It will be understood that the optimal temperature for the solution can depend on several factors, such as the type of non-polar biocompatible lipid present in the solution, the amount of time that the preform is contacted with the solution, and the desired amount of non-polar biocompatible lipid to be diffused into the preform. Preferably, the solution is maintained at a temperature of about 80° C. to about 150° C. (e.g., about 90° C. to about 150° C., or about 100° C. to about 150° C.), more preferably about 100° C. to about 130° C.

In certain embodiments, it is preferable to maintain the solution at a temperature that is high enough for the portion of the preform contacted with the solution to change to a translucent appearance (i.e., the portion of the preform changes from the opaque appearance typically associated with solid ultrahigh molecular weight polyethylene to a translucent appearance similar to that exhibited by ultrahigh molecular weight that has been heated to a temperature above its melting point) while in contact with the solution. While such a change in the optical transmissivity of ultrahigh molecular weight polyethylene typically is only observed when ultrahigh molecular weight polyethylene has been heated to a temperature at or above its melting point, the transition occurs at temperatures below the melting point of ultrahigh molecular weight polyethylene in the presence of some solvents, such as certain non-polar biocompatible lipids. Furthermore, the type of solvent will affect the temperature at which the transition is observed. While not wishing to be bound to any particular theory, it is believed that the aforementioned transition occurs at temperatures below the melting point of ultrahigh molecular weight polyethylene due to the swelling of the ultrahigh molecular weight polyethylene that can be caused by some solvents, such as non-polar biocompatible lipids. It is also believed that, when the ultrahigh molecular weight polyethylene contained in the preform has transitioned to such a translucent appearance, the mobility of the individual polyethylene molecules increases, which can help increase the rate at which the non-polar biocompatible lipid diffuses into the ultrahigh molecular weight polyethylene.

The preform can be irradiated using any suitable method. For example, the preform can be irradiated by exposing it to a suitable amount of gamma, x-ray, or electron beam radiation. Preferably, the preform is irradiated by exposing the mass to about 0.5 to about 10 Mrad (e.g., about 1.5 to about 6 Mrad) of gamma radiation using methods known in the art. While the preform can be exposed to amounts of radiation falling outside of the aforementioned range, such amounts of radiation tend to produce polymer compositions with unsatisfactory properties. In particular, radiation doses of less than about 0.5 Mrad generally provide insufficient cross-linking of the ultrahigh molecular weight polyethylene. Furthermore, while doses of greater than 10 Mrad may be used, the relatively high levels of cross-linking that result from such high radiation doses can result in increased brittleness of the ultrahigh molecular weight polyethylene.

Preferably, the preform is irradiated in an inert or reduced-pressure atmosphere. Irradiating the preform in an inert (i.e., non-oxidizing) or reduced-pressure atmosphere reduces the effects of oxidation and chain scission reactions which can occur during irradiation in an oxidative atmosphere. Typically, the preform is placed in an oxygen-impermeable package during the irradiation step. Suitable oxygen-impermeable packaging materials include, but are not limited to, aluminum, polyester coated metal foil (e.g., the Mylar® product available from DuPont Teijin Films), polyethylene terephthalate, and poly(ethylene vinyl alcohol). In order to further reduce the amount of oxidation which occurs during the irradiation of the preform, the oxygen-impermeable packaging may be evacuated (e.g., the pressure within the packaging may be reduced below the ambient atmospheric pressure) and/or flushed with an inert gas (e.g., nitrogen, argon, helium, or mixtures thereof) after the preform has been placed therein.

In certain embodiments of the methods of the invention, the method can further comprise the step of quenching a substantial portion of the free radicals generated in the ultrahigh molecular weight polyethylene during the irradiation of the preform. For example, the free radicals contained within the irradiated portion of the preform can be quenched by heating the irradiated preform to a temperature between room temperature and the melting point of ultrahigh molecular weight polyethylene in an oxygen-reduced, non-reactive atmosphere for a length of time sufficient to reduce the number of free radicals present in the preform (see, e.g., U.S. Pat. Nos. 5,414,049, 6,174,934, and 6,228,900). Alternatively, the free radicals contained within the irradiated portion of the preform can be quenched by heating the irradiated preform to a temperature at or above the melting point of ultrahigh molecular weight polyethylene in an oxygen-reduced, non-reactive atmosphere for a length of time sufficient to reduce the number of free radicals present in the preform (see, e.g., U.S. Pat. Nos. 6,017,975, 6,228, 900, 6,242,507, and 6,316,158).

The method of the invention can further comprise the step of drying the preform or polymer composition to remove excess non-polar biocompatible lipid and yield a preform or polymer composition having a desired final concentration of non-polar biocompatible lipid. For example, the preform can be dried after the preform has been contacted with the solution to swell the ultrahigh molecular weight polyethylene and diffuse the non-polar biocompatible lipid into at least a portion of the preform. Alternatively, the preform can be dried after the preform has been irradiated to produce the polymer composition. The preform or polymer composition can be dried using any suitable method. Preferably, the preform or polymer composition is dried by exposing it to an elevated temperature in a reduced-pressure atmosphere. Of course, the polymer composition is not dried to such an extent that all of the non-polar biocompatible lipid is removed therefrom.

The method of the invention can further comprise the step of sterilizing the polymer composition using any suitable process. The polymer composition can be sterilized at any suitable point, but preferably is sterilized after the preform has been irradiated. Suitable non-irradiative sterilization techniques include, but are not limited to, gas plasma or ethylene oxide methods known in the art. For example, the polymer composition can be sterilized using a PlazLyte® Sterilization System (Abtox, Inc., Mundelein, Ill.) or in accordance with the gas plasma sterilization processes described in U.S. Pat. Nos. 5,413,760 and 5,603,895.

The polymer composition produced by the method of the invention can be packaged in any suitable packaging material. Desirably, the packaging material maintains the sterility of the polymer composition until the packaging material is breached.

The following examples further illustrate the invention but, of course, should not be construed as in any way limiting its scope.

EXAMPLE 1

This example demonstrates the preparation of a polymer composition according to the method of the invention and the mechanical properties of the inventive polymer composition. Three similar samples (Polymer Compositions 1A-1C) of GUR 1050 ram-extruded ultrahigh molecular weight polyethylene, which has a molecular weight of about 5,000,000 to about 6,000,000 atomic mass units, were exposed to about 5 Mrad (50 KGy) of gamma radiation to cross-link at least a portion of ultrahigh molecular weight polyethylene contained therein. The samples were then heated to a temperature below the melting point of the ultrahigh molecular weight polyethylene to quench a substantial portion of the free radicals generated in the ultrahigh molecular weight polyethylene during the irradiation step. Polymer Compositions 1B and 1C (invention) were then immersed in squalane under conditions sufficient to swell the polyethylene and diffuse at least a portion of the squalane into the samples. In particular, Polymer Composition 1B was immersed in squalane for approximately 24 hours at a temperature of approximately 90° C., and Polymer Composition 1C was immersed in squalane for approximately 72 hours at a temperature of approximately 120° C. Polymer Composition 1A (comparative) was not immersed in a lipid.

Polymer Compositions 1B and 1C were then weighed to determine the amount of lipid (i.e., squalane) contained in each of the samples. Lastly, each of the polymer compositions was tested to determine its secant modulus (at 20% elongation) and its durometer hardness (i.e., Shore D Hardness). The results of these measurements are set forth in Table 1 below.

TABLE 1

| Lipid Content, Secant Modulus, and Shore D Hardness for Polymer Compositions 1A-1C. | | | |
|---|---|---|---|
| Polymer Composition | Lipid Content (wt. %) | Secant Modulus (MPa) | Shore D Hardness |
| 1A | — | 93.389 | 66 |
| 1B | 1.8 | 87.226 | 63.5 |
| 1C | 10.2 | 80.710 | 60 |

As evidenced by the data set forth above in Table 1, the inventive polymer composition containing a non-polar biocompatible lipid in the free volume of the cross-linked polyethylene matrix exhibits a lower secant modulus and a lower hardness than a similar polymer composition that does not contain a non-polar biocompatible lipid. In particular, a comparison of the secant modulus of each of the polymer compositions reveals that the secant modulus of the polymer composition decreases as the lipid content of the polymer composition increases. Furthermore, the data demonstrates that the hardness of the polymer composition similarly decreases as the lipid content of the polymer composition increases.

EXAMPLE 2

This example demonstrates the preparation of a polymer composition according to the method of the invention and the mechanical properties of the inventive polymer composition. Three similar samples (Polymer Compositions 2A-2C) of GUR 1050 ram-extruded ultrahigh molecular weight polyethylene, which has a molecular weight of about 5,000,000 to about 6,000,000 atomic mass units, were exposed to about 5 Mrad (50 KGy) of gamma radiation to cross-link at least a portion of ultrahigh molecular weight polyethylene contained therein. The samples were then heated to a temperature below the melting point of the ultrahigh molecular weight polyethylene to quench a substantial portion of the free radicals generated in the ultrahigh molecular weight polyethylene during the irradiation step. The polymer compositions were then immersed in squalene for approximately 8 hours at a temperature of approximately 140° C. The polymer compositions were then dried in a vacuum oven for approximately 24 hours at temperatures of 60° C., 100° C., and 115° C., respectively.

The polymer compositions were weighed to determine the amount of lipid (i.e., squalene) contained in each of the samples. Each of the polymer compositions was also tested to determine its secant modulus (at 20% elongation) and its durometer hardness (i.e., Shore D Hardness). The results of these measurements are set forth in Table 2 below.

TABLE 2

| Lipid Content, Secant Modulus, and Shore D Hardness for Polymer Compositions 2A-2D. | | | |
|---|---|---|---|
| Polymer Composition | Lipid Content (wt. %) | Secant Modulus (MPa) | Shore D Hardness |
| 2A | 25 | 60.95 | 49 |
| 2B | 20.5 | 66.52 | 52.5 |
| 2C | 3.1 | 78.959 | 60 |

As evidenced by the data set forth above in Table 2, the inventive polymer composition containing a non-polar biocompatible lipid in the free volume of the polymer composition exhibits a relatively low secant modulus and low hardness. Furthermore, the data demonstrates that the mechanical properties (e.g., secant modulus and hardness) of the polymer composition are dependent on, for example, the amount of lipid contained in the free volume of the polymer composition.

EXAMPLE 3

This example demonstrates the preparation of a polymer composition according to the method of the invention and the dynamic mechanical properties of the inventive polymer composition. Two similar samples (Polymer Compositions 3A and 3B) of GUR 1050 ram-extruded ultrahigh molecular weight polyethylene, which has a molecular weight of about 5,000,000 to about 6,000,000 atomic mass units, were exposed to about 5 Mrad (50 KGy) of gamma radiation to cross-link at least a portion of ultrahigh molecular weight polyethylene contained therein. The samples were then heated to a temperature below the melting point of the ultrahigh molecular weight polyethylene to quench a substantial portion of the free radicals generated in the ultrahigh molecular weight polyethylene during the irradiation step. Polymer Composition 3B (invention) was then immersed in squalene for approximately 8 hours at a temperature of approximately 120° C. The resulting lipid content of Polymer Composition 3B was determined to be approximately 2.9 wt. % based on the total weight of the polymer composition. Polymer Composition 3A (comparative) was not immersed in a non-polar biocompatible lipid.

Each of the polymer compositions was then tested using Dynamic Mechanical Analysis to determine its storage modulus and loss modulus. The tan δ for the polymer compositions was also calculated by dividing the loss modulus by the storage modulus. The results of these measurements and calculations are set forth in Table 3 below.

TABLE 3

Storage Modulus, Loss Modulus, and Tan δ for Polymer Compositions 3A and 3B.

| Polymer Composition | Storage Modulus (MPa) | Loss Modulus (MPa) | Tan δ |
|---|---|---|---|
| 3A | 713.3 | 58.3 | 0.082 |
| 3B | 364.2 | 32.5 | 0.089 |

As evidenced by the data set forth above in Table 2, the inventive polymer composition containing a non-polar biocompatible lipid in the free volume of the polymer composition exhibits a lower storage modulus and a loss modulus than a similar polymer composition that does not contain a non-polar biocompatible lipid.

EXAMPLE 4

This example demonstrates the preparation of a polymer composition according to the method of the invention and the dynamic mechanical properties of the inventive polymer composition. Four similar samples (Polymer Compositions 4A-4D) of GUR 1050 ram-extruded ultrahigh molecular weight polyethylene, which has a molecular weight of about 5,000,000 to about 6,000,000 atomic mass units, were exposed to about 5 Mrad (50 KGy) of gamma radiation to cross-link at least a portion of ultrahigh molecular weight polyethylene contained therein. The samples were then heated to a temperature below the melting point of the ultrahigh molecular weight polyethylene to quench a substantial portion of the free radicals generated in the ultrahigh molecular weight polyethylene during the irradiation step. Polymer Compositions 4B, 4C, and 4D (invention) were then immersed in squalane under conditions sufficient to swell the polyethylene and diffuse at least a portion of the squalane into the samples. In particular, Polymer Composition 4B was immersed in squalane for approximately 24 hours at a temperature of approximately 90° C., Polymer Composition 4C was immersed in squalane for approximately 72 hours at a temperature of approximately 100° C., and Polymer Composition 4D was immersed in squalane for approximately 72 hours at a temperature of approximately 120° C. Polymer Composition 4A (comparative) was not immersed in a non-polar biocompatible lipid.

Polymer Compositions 4B, 4C and 4D were then weighed to determine the amount of lipid (i.e., squalane) contained in each of the samples. Each of the polymer compositions was also tested using Differential Scanning Calorimerty (DSC) to determine its crystallinity. The measured crystallinity values generated by the DSC tests for the Polymer Compositions 4B, 4C, and 4D were then corrected to account for the lipid contained in each of the polymer compositions. The results of these measurements and calculations are set forth in Table 4 below.

TABLE 4

Lipid Content, Measured Crystallinity, and Corrected Crystallinity for Polymer Compositions 4A-4D.

| Polymer Composition | Lipid Content (wt. %) | Measured Crystallinity (wt. %) | Corrected Crystallinity (wt. %) |
|---|---|---|---|
| 4A | — | 49 | 49 |
| 4B | 1.8 | 44.3 | 45.1 |
| 4C | 4.9 | 43.3 | 45.5 |
| 4D | 10.2 | 40.6 | 45.2 |

As evidenced by the data set forth above in Table 2, the inventive polymer composition containing a non-polar biocompatible lipid in the free volume of the polymer composition exhibits a lower crystallinity than a similar polymer composition that does not contain a non-polar biocompatible lipid.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for producing a polymer composition, the method comprising the steps of:
   (a) providing a preform comprising ultrahigh molecular weight polyethylene having a weight average molecular weight of about 400,000 atomic mass units or more,
   (b) providing a solution comprising at least one non-polar biocompatible lipid selected from the group consisting of squalane, squalene, fatty acids, glycerides, cholesterol, cholesterol esters, and mixtures thereof,
   (c) contacting at least a portion of the preform with the solution to swell the ultrahigh molecular weight polyethylene and diffuse the non-polar biocompatible lipid into at least a portion of the preform, and
   (d) irradiating at least the portion of the preform contacted with the solution in step (c) to cross-link at least a portion of the ultrahigh molecular weight polyethylene contained therein and form a polymer composition comprising a matrix of cross-linked polyethylene molecules having a free volume, wherein the at least one biocompatible lipid fills at least a portion of the free volume of the matrix.

2. The method of claim 1, wherein the non-polar biocompatible lipid is selected from the group consisting of squalane, squalene, and mixtures thereof.

3. The method of claim 1, wherein the solution is maintained at a temperature of about 80° C. to about 150° C. during step (c).

4. The method of claim 1, wherein the preform is contacted with the solution for about 2 hours or more in step (c).

5. The method of claim 1, wherein the method further comprises the step of drying the preform produced in step (c) or the polymer composition produced in step (d) to remove excess non-polar biocompatible lipid and yield a preform or polymer composition having a desired final concentration of non-polar biocompatible lipid.

6. A method for producing a polymer composition, the method comprising the steps of:
   (a) providing a preform comprising ultrahigh molecular weight polyethylene having a weight average molecular weight of about 400,000 atomic mass units or more,
   (b) providing a solution comprising at least one non-polar biocompatible lipid selected from the group consisting of squalane, squalene, fatty acids, glycerides, cholesterol, cholesterol esters, and mixtures thereof,
   (c) contacting at least a portion of the preform with the solution to swell the ultrahigh molecular weight polyethylene and diffuse the non-polar biocompatible lipid into at least a portion of the preform, and
   (d) irradiating at least the portion of the preform contacted with the solution in step (c) to cross-link at least a portion of the ultrahigh molecular weight polyethylene contained therein and form a polymer composition comprising a matrix of cross-linked polyethylene molecules, wherein the at least one biocompatible lipid fills at least a portion of the matrix.

7. The method of claim 6, wherein the non-polar biocompatible lipid is selected from the group consisting of squalane, squalene, and mixtures thereof.

8. The method of claim 6, wherein the solution is maintained at a temperature of about 80° C. to about 150° C. during step (c).

9. The method of claim 6, wherein the preform is contacted with the solution for about 2 hours or more in step (c).

10. The method of claim 6, wherein the method further comprises the step of drying the preform produced in step (c) or the polymer composition produced in step (d) to remove excess non-polar biocompatible lipid and yield a preform or polymer composition having a desired final concentration of non-polar biocompatible lipid.

* * * * *